US006141202A

United States Patent [19]

Maeckel et al.

[11] Patent Number: 6,141,202

[45] Date of Patent: Oct. 31, 2000

[54] METHOD AND APPARATUS FOR TRIGGERING A FUSE

[75] Inventors: Rainer Maeckel, Koenigswinter; Thomas Schulz, Unterensingen, both of Germany

[73] Assignee: DaimlerChrysler AG, Stuttgart, Germany

[21] Appl. No.: 09/370,264

[22] Filed: Aug. 9, 1999

[30] Foreign Application Priority Data

Aug. 7, 1998 [DE] Germany ............................ 198 35 781

[51] Int. Cl.[7] ............................ H02H 3/08; H02H 3/00; H01H 71/12; H01H 85/00

[52] U.S. Cl. ............................ 361/187; 361/102; 361/87; 361/93; 361/104; 361/160; 337/5; 337/157; 337/6; 337/14.3

[58] Field of Search ............................ 361/5, 62, 63, 361/78, 79, 87, 93, 102, 103, 104, 139, 160, 187, 115; 337/4, 5, 6, 142, 143, 157, 158

[56] References Cited

U.S. PATENT DOCUMENTS

| | | | |
|---|---|---|---|
| 3,202,836 | 8/1965 | Nyberg | 307/88.5 |
| 3,317,791 | 5/1967 | Price et al. | 317/22 |
| 3,555,354 | 1/1971 | Kotos | 317/11 |
| 3,614,533 | 10/1971 | Douglas et al. | 317/18 D |
| 3,684,923 | 8/1972 | Keeler, II | 317/13 D |
| 3,689,801 | 9/1972 | Engel et al. | 317/26 |
| 3,713,005 | 1/1973 | Engel | 307/293 |
| 3,728,583 | 4/1973 | Wickson | 317/33 SC |
| 3,868,552 | 2/1975 | Wickson | 317/40 A |
| 3,958,206 | 5/1976 | Klint | 337/406 |
| 4,000,446 | 12/1976 | Vandevier et al. | 317/36 TD |
| 4,004,201 | 1/1977 | DePuy | 317/33 SC |
| 4,149,210 | 4/1979 | Wilson | 361/95 |
| 4,203,142 | 5/1980 | Lee | 361/42 |
| 4,218,718 | 8/1980 | Sun | 361/79 |
| 4,258,403 | 3/1981 | Shimp | 361/42 |
| 4,345,292 | 8/1982 | Jaeschke et al. | 361/94 |
| 4,442,472 | 4/1984 | Pang et al. | 361/96 |
| 4,538,133 | 8/1985 | Pflanz | 337/4 |
| 4,573,032 | 2/1986 | Hickey | 337/162 |
| 4,661,807 | 4/1987 | Panaro | 340/638 |
| 4,752,852 | 6/1988 | Ahl et al. | 361/58 |

(List continued on next page.)

FOREIGN PATENT DOCUMENTS

| | | | |
|---|---|---|---|
| 3221919 | 12/1983 | Germany | H01H 85/04 |
| 4445060 | 4/1996 | Germany . | |
| 19527997 | 2/1997 | Germany . | |

OTHER PUBLICATIONS

"Commutating Current–Limiters–an Effective Alternative for High Current Protection" by John S. Schaffer, 1996.

Schaffer, "Neta World", pp. 7–18, 1997.

Electronic Fuse Provides Improved Protection and Coordination on In–Plant Distribution, 1996.

Systems, by Carey J. Cook, "Neta World", pp. 43–48, 1997.

Handbook entitled "Hilfsbuch der Elektrotechnik", published by AEG Telefunken vol. 2, pp. 293 to 391.

*Primary Examiner*—Leo P. Picard
*Assistant Examiner*—Anatoly Vortman
*Attorney, Agent, or Firm*—W. F. Fasse; W. G. Fasse

[57] ABSTRACT

The response time of a melting fuse is controlled or influenced by temporarily boosting a threshold level from a first constant value ($I_1$) to a second dynamic value ($I_2$) which is then caused to decay in a controlled manner during a fixed time between ($t_1$) and ($t_2$) and in accordance with a selectable decay function. If a current (m) flowing through the fuse exceeds the decaying threshold value a fuse blowing current is generated and supplied to the fuse, whereby the fuse blows sooner than it would have, if the excess current had prevailed for a long enough time between ($t_1$) and ($t_X$). On the other hand, the fuse does not blow in response to short duration transient excess currents that occur, for example at starting an engine. The engine start impulse which may be used to temporarily raise the threshold value from ($I_1$) to ($I_2$) and then cause said controlled decay.

12 Claims, 1 Drawing Sheet

U.S. PATENT DOCUMENTS

| | | | |
|---|---|---|---|
| 4,920,446 | 4/1990 | Pflanz | 361/93 |
| 4,920,448 | 4/1990 | Bonhomme | 361/102 |
| 5,038,246 | 8/1991 | Durivage, III | 361/93 |
| 5,093,657 | 3/1992 | Bishop et al. | 340/638 |
| 5,195,012 | 3/1993 | Tripodi | 361/94 |
| 5,307,230 | 4/1994 | MacKenzie | 361/96 |
| 5,311,392 | 5/1994 | Kinney et al. | 361/93 |
| 5,617,078 | 4/1997 | Durif et al. | 340/652 |
| 5,740,027 | 4/1998 | Akers et al. | 363/97 |
| 5,841,618 | 11/1998 | Dilkes et al. | 361/110 |
| 5,875,087 | 2/1999 | Spencer et al. | 361/87 |

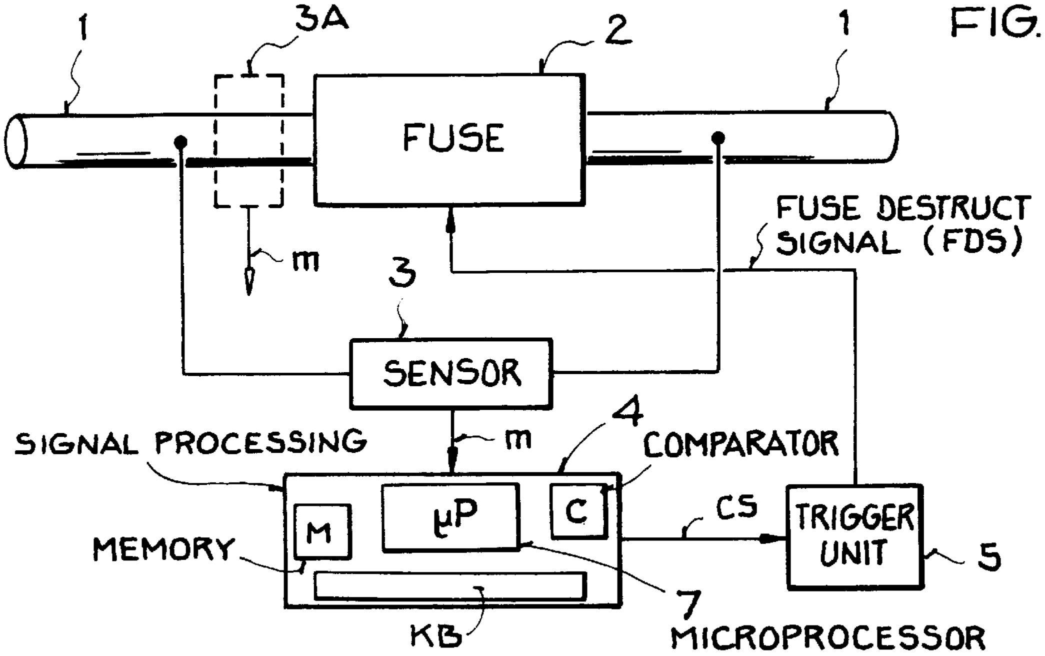
FIG. 1
FIG. 2A
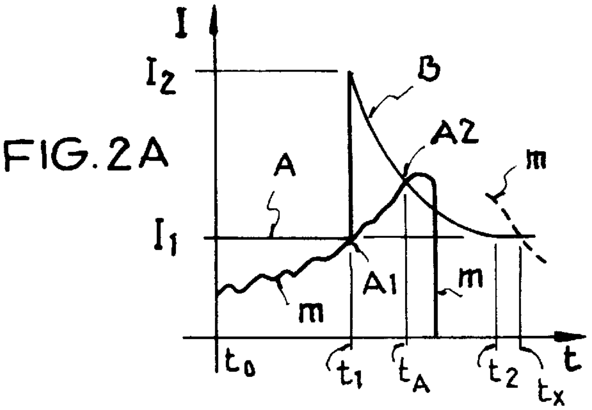
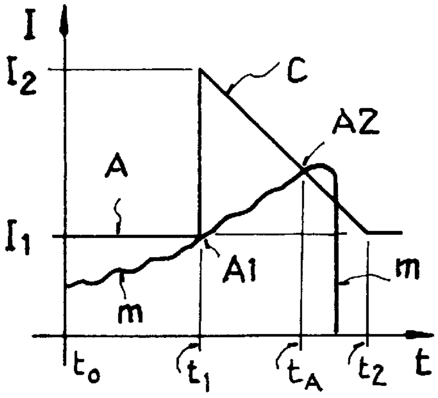
FIG. 2B
FIG. 2c
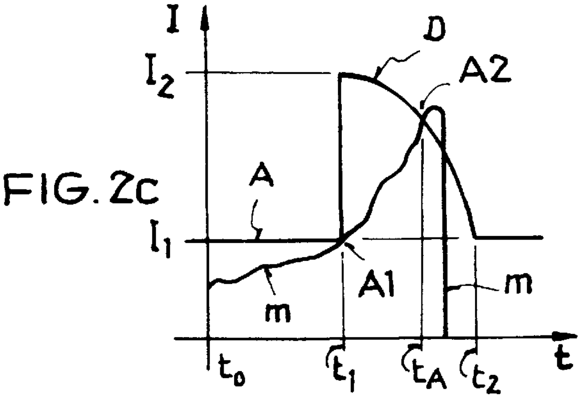

METHOD AND APPARATUS FOR TRIGGERING A FUSE

PRIORITY CLAIM

This application is based on and claims the priority under 35 U.S.C. §119 of German Patent Application 198 35 781.8-34, filed on Aug. 7, 1998, the entire disclosure of which is incorporated herein by reference.

FIELD OF THE INVENTION

The invention relates to a method and apparatus for controlling the triggering of a fuse in an electrical conductor, particularly in the electrical system of a motor vehicle.

BACKGROUND INFORMATION

It is conventional to use safety melting fuses in the electrical systems of motor vehicles for protecting the electrical components. Providing protection with such melting fuses has the disadvantage that an optimal protection of the circuit system and its components is not possible due to several factors. Normally, conventional electrical conductors in electrical systems for motor vehicles are capable of withstanding transient electrical excess currents that are higher than the blow out current of the fuse provided that the excess currents have a short time duration. Thus, for transient short duration excess currents a conventional fuse is not accurately dimensioned. On the other hand, when excess current have a longer duration, such a fuse tends to interrupt the circuit too late. In that case, the electrical conductor and/or circuit component is not sufficiently protected. For example, if an excess current is 35% relative to the rated fuse blow out threshold of the fuse it may take half an hour until the fuse actually interrupts the circuit. Even at an excess current of 250% of the rated trigger current of the fuse, it may take 5 seconds until the fuse interrupts the circuit.

In connection with so-called passive melting fuses there are several conventional methods to influence the response characteristic of such fuses. On the one hand, different materials for making the fuse are used, such as copper or zinc forming the melting elements. On the other hand, the melting zones of such fuses may be covered with tin in order to influence or adapt the response characteristic. These methods have the disadvantage that a substantial effort and expense is involved because each different electrical conductor system requires a new adaptation for achieving an optimal response characteristic. The reason for requiring this adaptation is the fact that not only the characteristics of the melting elements must be taken into account, but also individual conditions of a particular electrical conductor system must receive attention such as damaged conductor cross-sections, operating temperatures, and faulty insulations which all have an influence on the response characteristic. As a result, even with a high effort and expense only a limited adaptation of the fuses to the particular electrical system can be achieved by the above mentioned conventional methods. As a result, standardized fuses are used in electrical systems. Such standardized fuses are cost effective, but provide only a limited protection.

German Patent Publication DE 195 27 997 A1 discloses a method in which the current passing through the fuse is measured. If the measured current exceeds a predetermined tripping value, an active blowing out of the fuse is performed. A disadvantage of this conventional method is seen in that the blow out current value or characteristic of the fuse is fixed, whereby the conductor capabilities to withstand certain overloads for short time durations are not utilized or not fully utilized.

German Patent Publication DE 44 45 060 C1 discloses a power switch equipped with an electronic circuit breaker for processing adjustable parameters, particularly the tripping current and the delay time. A bypass circuit (15) causes an enforced opening of the power switch in response to a situation in which the switch did not open even though the adjusted tripping current was exceeded. The bypass circuit (15) includes circuit elements for forming a time and current dependent response characteristic, whereby the protection against the destruction of the power switch is improved. The response characteristic of the bypass circuit (15) may be automatically variable depending on the parameters that have been adjusted for a normal tripping and opening of the power switch. It is a disadvantage of such an arrangement that the bypass circuit is expensive and does not itself serve for interrupting the circuit, but rather merely protects the power switch against destruction when the electronic circuit breaker fails.

A handbook entitled "Hilfsbuch der Elektrotechnik", published by AEG Telefunken VOl. 2, 11th Edition, Berlin, 1979, pgs. 294 to 391, discloses protection devices particularly over current or excess current time relays which have a release timing dependent on the size of the over or excess current, whereby the release or tripping characteristic of the over current time relay corresponds to the load characteristic of the circuit arrangement to be protected. A disadvantage in such an arrangement is the fact that the entire load characteristic must be recorded and stored in a memory. Additionally, when measuring the excess or over current, a time duration must be measured, which is then compared with the tripping time duration. Such an approach requires a substantial effort and expense.

OBJECTS OF THE INVENTION

In view of the foregoing it is the aim of the invention to achieve the following objects singly or in combination:

- to provide a method and circuit arrangement for controlling the operation of melting fuses with a small effort and expense, while optimally utilizing the excess power tolerance of the respective circuit component;
- to permit a controlled time delay for the circuit interruption, whereby such time delay is shorter than the delay tolerance of the circuit to be protected;
- to avoid a premature circuit interruption in situations where the circuit has recognized that an excess current decays rapidly within the delay tolerance of the circuit to be protected; and
- to use as a fixed reference a threshold current value or an ignition starting impulse for generating a rapidly decaying excess current dynamic threshold value, to produce a current for blowing the melting fuse earlier than it normally would when longlasting excess currents occur, and to not blow the fuse when short duration transient excess currents occur.

SUMMARY OF THE INVENTION

According to the invention there is provided a method for blowing a melting fuse for an electrical conductor, particularly in the electrical system of a motor vehicle, comprising the following features. Comparing the value of an electrical parameter (m) that measures or represents a current presently flowing through the fuse with a first constant threshold value ($I_1$) to see whether the parameter (m) exceeds the first value ($I_1$), if so, providing a second time variable higher threshold value ($I_2$) and raising said second threshold value to a level higher than the first threshold, wherein the second higher time variable threshold value ($I_2$) is decayed within a predetermined decay time in accordance with a decay function, and destroying the fuse when said parameter value (m) is exceeding the second time variable trigger value ($I_2$).

According to the invention, the second dynamic threshold is raised higher than the first constant threshold and caused to decay from its peak that is at the most as high as the blow out threshold of the respective fuse, for a short period of time that begins when a measured parameter or current value (m) starts to exceed the first threshold value and ends when the temporarily raised second threshold value has decayed down to the level of the first threshold value. If within this fixed time period the measured value (m) does exceed the decaying second threshold value, a fuse destruct signal is generated in response to that fact and applied to destroy the fuse substantially without further delay to protect the respective circuit in which the fuse is connected. A fuse destruct signal will not be produced when the measured value (m) stays below the decaying second threshold value during the predetermined decay time of the second threshold value.

The invention has a number of advantages. For example, a premature destruction of the fuse in response to short duration high current peaks in the circuit is prevented, for example when the engine is started. Further, an undue delay in the destruction of the fuse is also prevented, for example when a short-circuit should exist in the electrical system of the engine.

BRIEF DESCRIPTION OF THE DRAWINGS

In order that the invention may be clearly understood it will now be described in connection with example embodiments, with reference to the accompanying drawings, wherein:

FIG. 1 shows a schematic block diagram of a circuit arrangement according to the invention for controlling the timing of blowing a melting fuse;

FIG. 2A illustrates an exponential decay characteristic or function for a dynamic, time variable second threshold value;

FIG. 2B shows a linear decay characteristic or function for the second threshold value; and FIG. 2C shows a parabolic decay characteristic or function for the second threshold value.

DETAILED DESCRIPTION OF PREFERRED EXAMPLE EMBODIMENTS AND OF THE BEST MODE OF THE INVENTION

FIG. 1 shows schematically an electrical conductor 1 that is, for example part of an electrical circuit system of a motor vehicle. A melting fuse 2 is arranged in series in the conductor 1. A sensor 3 is connected in parallel to the fuse for sensing a parameter m that is or represents the current flowing through the fuse. As shown, the sensor 3 would measure a voltage drop across the fuse. However, a sensor 3A could be arranged in series with the fuse 2 to measure directly the current flowing through the fuse. If the sensor 3 is arranged in parallel to the fuse 2 the sensor could include a conversion factor that would provide a parameter output signal m representing the current flowing through the fuse 2.

The measured signal m is supplied to a signal processing circuit 4 which includes a comparator C, a memory M, and a microprocessor 7. Modern vehicles are already equipped with a microprocessor that could be used for the present purposes. The signal m is first compared in the comparator C with a first fixed threshold value $I_1$ that may, for example, be stored in the memory M through the keyboard KB or it may be produced by the microprocessor 7 in response to an engine starting ignition impulse. When the result of this first comparing of the measured signal m with the fixed threshold value $I_1$ shows that m exceeds $I_1$ the microprocessor 7 will raise the threshold value to a second time variable, dynamic value that is higher than the first threshold value $I_1$ but the peak of the second threshold $I_2$ will normally not exceed the rated fuse blow out threshold. The second threshold value $I_2$ is caused to decay by the microprocessor 7 in accordance with a predetermined decay function within a fixed time period $t_2$–$t_1$ as will be described below with reference to FIGS. 2A, 2B and 2C. If the measured value m exceeds the decaying second threshold value $I_2$ during the decay time, a control signal CS will be supplied by the signal processing circuit 4 to a trigger unit 5 which in turn generates a fuse destruct or blow out signal FDS that is applied to the fuse 2 to rapidly destroy the fuse, thereby opening the conductor 1 to safeguard the electrical system to be protected.

The features that are common to FIGS. 2A, 2B and 2C will now be described in conjunction. Only the different features will be described separately. Each of the three diagrams shows on its ordinate currents I as a function of time t shown on the abscissa. Each diagram shows three characteristics m, A and B, or m, A and C, or m, A and D. The characteristic or curve m represents the measured electrical parameter m that is sensed either with the sensor 3 or the sensor 3A as described, the horizontal line A represents a first threshold characteristic A which is a fixed or static current threshold value $I_1$ which is for instance generated or entered through a keyboard KB into the memory M of the signal processing circuit 4. The third characteristic B or C or D is generated by the microprocessor 7 forming part of or connected to the signal processing circuit 4. The value of the third characteristic B, C or D is a dynamic threshold current value I2 that is time variable and higher than the first threshold value $I_1$. At its peak the second threshold value is equal, at the most, to a rated fuse blow out of the fuse 2.

Conventionally, the response time of a melting fuse is rather slow and depends on the type of fuse and even on the heat removal capacity of the electrical system of which the conductor 1 is a part. The fuse 2 would conventionally blow at the time $t_X$ if the measured current or its parameter m exceeds the first threshold $I_1$, as shown at the curve point $A_1$ at the time $t_1$ and the excess current prevails for a sufficient length of time between $t_1$ and $t_X$. The invention aims at improving or controlling the timing of blowing out the fuse 2. This aim is accomplished by generating a dynamic second threshold value $I_2$ at the point of time $t_1$ when the curve m passes through the first threshold $I_1$ at the point $A_1$, by decaying the second threshold value $I_2$ in response to a decay function B, C or D generated by the microprocessor 7 or stored in the memory and used by the microprocessor 7.

In FIG. 2A the decay of the second threshold value $I_2$ is shown by the curve B providing an exponential decay within the fixed time duration $t_2$–$t_1$. The measured current m keeps rising and intersects at point $A_2$ with the decaying curve B at the point of time $t_A$ which, according to the invention, occurs earlier than the time $t_X$. At this point of time $t_A$ the signal processing circuit 4 with its microprocessor 7 generates a control signal CS which is supplied to the trigger unit 5 which in turn produces a fuse destruct or blow out signal FDS that is supplied to the fuse to blow the fuse at point $t_A$. This controlled timing of the fuse response to an excess current increases the safety of the system. The curve B continues to decay until at the time $t_2$ the first threshold level $I_1$ is reached again.

In FIG. 2B, the decay characteristic C is linear and the blow out time $t_A$ occurs somewhat later than the blow out time in FIG. 2A. However, the blow out time also occurs at the time $t_A$ where the measured current m intersects the decaying linear characteristic C at $A_2$.

In FIG. 2C the decay characteristic D is parabolic, but the point of intersection $A_2$ occurs at a point of time at which the blow out signal FDS is generated somewhat later than in FIG. 2A, but faster than in FIG. 2B and before $t_X$.

From the above description it is clear that the point $A_2$ where the curve m intersects either B or C or D or rather its occurrence at time $t_A$ depends on the decay function and on the rapidity of the rise of the curve m. Other decay functions than those shown as examples may be generated by the microprocessor for particular fuse blow out purposes.

The method according to the invention can be combined with triggering criteria that depend on particular occurrences in the electrical system, for example the second threshold value $I_2$ may be established in direct response to operating the ignition switch, thereby preventing a fuse blow out in response to starting the engine.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for blowing, in an electrical conductor, a melting fuse having a fuse blow out threshold, comprising the following steps:

(a) sensing an electrical parameter with a sensor (3) to provide a measured value (m) representing a current passing through said melting fuse, (b) first generating a constant first threshold value ($I_1$) below said fuse blow out threshold, (c) first comparing said measured value (m) with said constant first threshold value ($I_1$) for providing a first difference value, (d) generating, in response to said first difference value, a dynamic time variable second threshold value ($I_2$) higher than said first threshold value ($I_1$) and corresponding at the most to said fuse blow out threshold, (e) decaying said second higher threshold value ($I_2$) within a fixed decay time period ($t_2$–$t_1$) and in accordance with a decay function down to said first threshold value ($I_1$), (f) second comparing said decaying second higher threshold value ($I_2$) with said measured value (m) for ascertaining whether during said fixed decay time period said measured value (m) exceeds said second threshold value ($I_2$) to provide a second difference value, (g) generating a fuse destruct signal (FDS) in response to said second difference value, and (h) blowing said melting fuse in response to said fuse destruct signal (FDS).

2. The method of claim 1, wherein said melting fuse blowing takes place within said fixed decay time period ($t_2$–$t_1$).

3. The method of claim 1, further comprising storing at least one of said first threshold value ($I_1$) and said second time variable higher threshold value ($I_2$) in a memory (M), and recalling a stored value from said memory for said first and second comparing steps.

4. The method of claim 1, further comprising calculating and generating at least one of said first threshold value ($I_1$) and said second time variable higher threshold value ($I_2$) in a microprocessor (7).

5. The method of claim 1, wherein said decay function for said higher second time variable threshold value ($I_2$) has any one of the following decay characteristics as a function of time: linear, exponential, and parabolic.

6. The method of claim 1, wherein said electrical conductor with its fuse is installed in an engine electrical system, and wherein said generating step (d) is responsive to an ignition impulse for preventing a blow out triggered by said ignition impulse.

7. An apparatus for performing the method of claim 1, comprising a signal processing evaluation circuit (4) and a memory (M) for storing an evaluation result in said memory (M).

8. The apparatus of claim 5, further comprising a microprocessor (7) for cooperation with said evaluation circuit (4).

9. A method for controlling the timing for blowing a melting fuse having a fuse blow out threshold in an electrical conductor of an electric system, comprising the following steps:

(a) measuring a current (m) flowing through said melting fuse, (b) providing a first control signal when said measured current (m) exceeds a first static threshold value ($I_1$), (c) generating in response to said first control signal a second dynamic threshold value ($I_2$) higher than said first static threshold value ($I_1$) and at the most corresponding to said fuse blow out threshold, (d) decaying said dynamic second threshold value ($I_2$) within a fixed decay time ($t_2$–$t_1$) and in accordance with a decay function down to said first threshold value, (e) generating a second control signal when said measured current (m) exceeds said dynamic second threshold value ($I_2$), and (f) blowing said melting fuse in response to said second control signal, whereby said fuse will be destroyed within said fixed decay time ($t_2$–$t_1$) when an excess current flows through said melting fuse but will not be destroyed when a transient excess current flows through said fuse.

10. The method of claim 9, further comprising generating said first and second threshold values and said decay function in a signal processing circuit (4) including a microprocessor (7).

11. The method of claim 9, wherein said step of decay blowing said melting fuse occurs at a point of time ($t_A$) within said fixed period of time ($t_2$–$t_1$) and wherein said point of time ($t_A$) depends on said decay function which is generated by a microprocessor.

12. The method of claim 9, wherein said electrical conductor with its fuse is installed in an engine electrical system, and wherein said generating step (c) is responsive to an ignition impulse for preventing a blow out triggered by said ignition impulse.

* * * * *